Sept. 29, 1942.                S. WEENING                 2,297,040
                             STRUCTURAL UNIT
                          Filed March 19, 1940           2 Sheets-Sheet 1
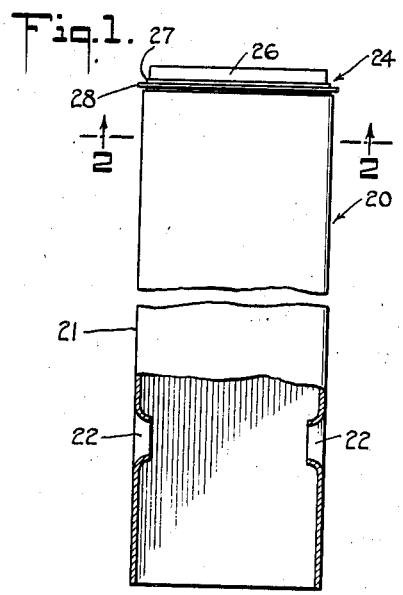
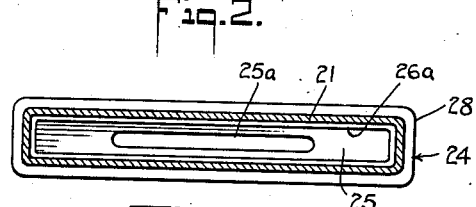
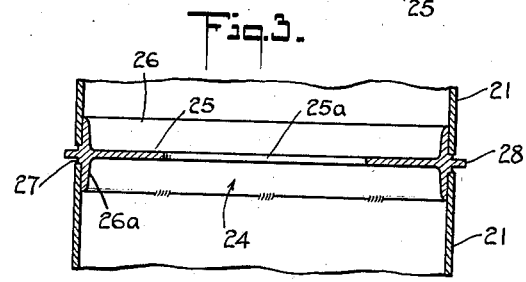
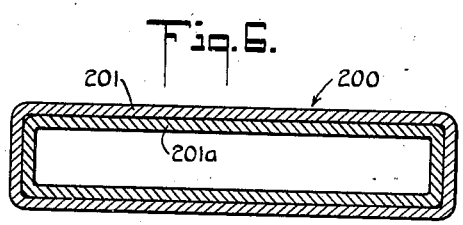
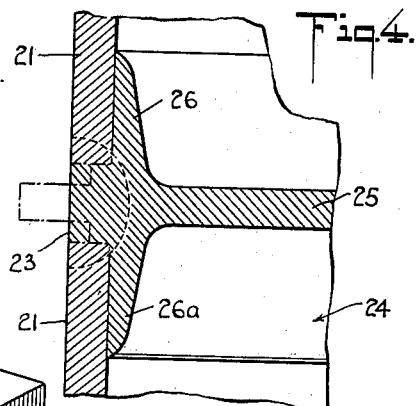
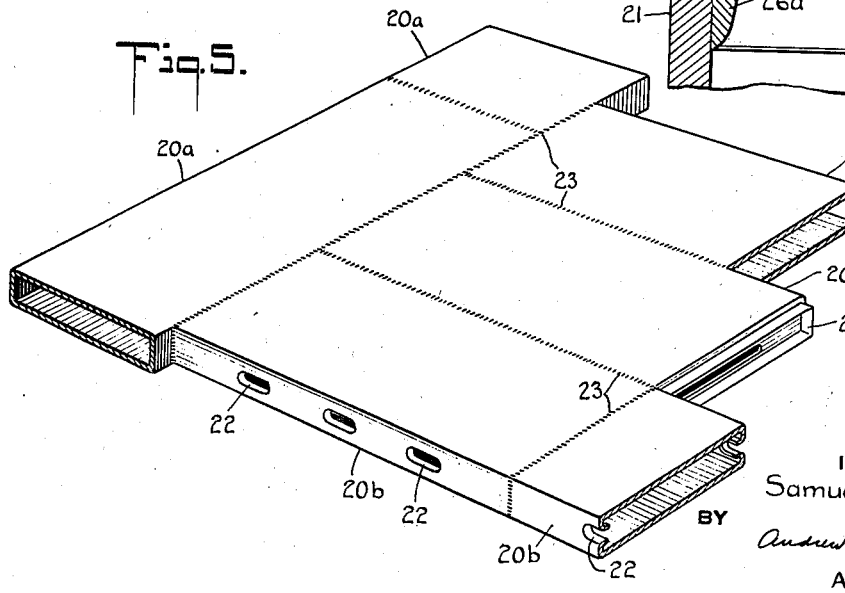
INVENTOR
Samuel Weening
BY
Andrew L. Hubbard
ATTORNEY

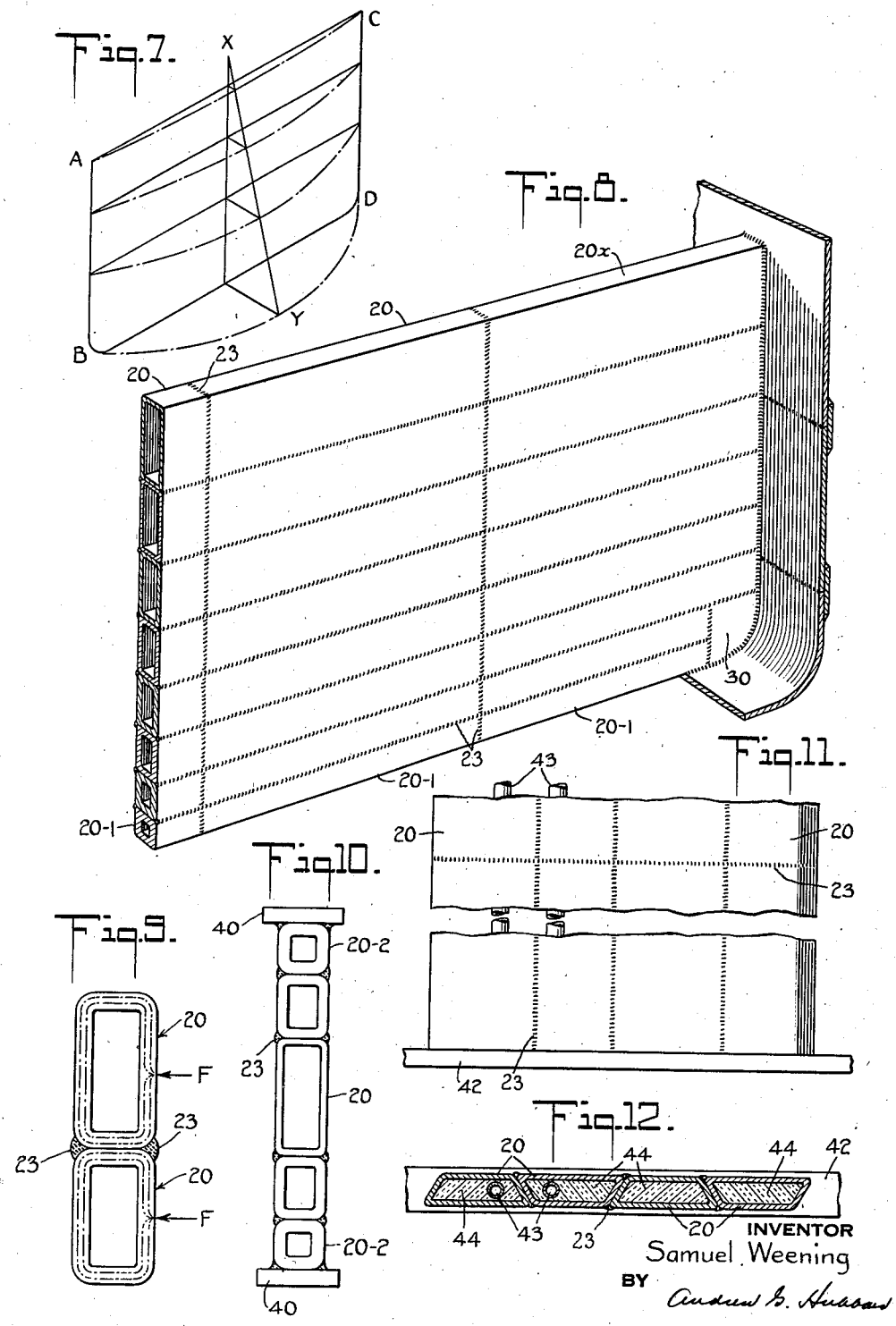

Patented Sept. 29, 1942

2,297,040

UNITED STATES PATENT OFFICE 2,297,040

STRUCTURAL UNIT

Samuel Weening, Tottenville, N. Y.

Application March 19, 1940, Serial No. 324,889

1 Claim. (Cl. 189—34)

The present invention relates to an improved structural unit and method of construction.

It is a particular object of the present invention to provide an improved structural unit adapted for securement to structural units of like characteristics, to form an engineering structure embodying great resistance to compressional and flexural stresses, with substantial freedom from stress-flow disturbances and stress-flow concentrations.

It is an object of the invention to provide an improved tubular structural unit, preferably of rectangular cross-section, embodying an internal structural web or diaphragm means arranged transversely of the longitudinal axis. Said tubular unit is adapted to be placed in wall-to-wall abutting relation with like tubular units and interconnected thereto by welding at the areas of abutment.

A wall or like load bearing structure comprising units pursuant to the present invention and secured as aforesaid is substantially free from stress flow concentrations and disturbances.

It is an object of the invention to provide an improved structural unit comprising the combination with a tubular body member, of a transversely arranged internal web or diaphragm member adapted to stiffen said tubular body member against collapse, while affording means whereby the tubular body member of a second unit may be structurally secured to such first unit.

It is an object of the invention to provide a wall or floor, girder, or like engineering structure, comprising rectangular tubular sections of uniform depth, but having variant wall thickness, according to the load-bearing requirements of such structure.

The purpose of all engineering structures is to receive external forces and to distribute and transmit such forces to an operatively associated structure or supporting element. Such distribution and transmission of forces involve flow of stress within the component elements of the structure, from one to another of such component elements, and from the structure to its supporting or otherwise operatively associated structure.

It is known to those skilled in the art that flow of stress within a structure is analogous to flow of liquids within a conduit. Changes in physical characteristics of a structure or the elements thereof, engender disturbances of stress flow and resultant undesirable stress concentrations which require substantial areas for normalization.

Any abrupt change in direction of stress flow results in increased stress concentration, thereby adversely affecting the free distribution and transmission of the load imposed upon the structure. At locations where an external force is applied, where changes in cross section occur, or where an element of a structure joins with or is secured to another element, a concentration of stress has been shown to exist.

In the present invention, novel rectangular tubular units are placed in wall to wall abutting relation and welded at the areas of edge contact, to form a load carrying girder, deck, wall or other engineering structure. Each tubular unit is homogeneous and affords substantially uniformly distributed stress flow with minimal concentrations. The welding of one unit to another, as compared to riveted or like connections, largely eliminates stress flow concentrations in the areas of securement.

Suitable web structures or diaphragms, arranged transversely of each tubular unit and welded thereto, afford internal stiffening of each tubular unit without materially increasing stress flow concentrations. Such internal structural member embodies a central web, associated with which are flanges or equivalent for securement to the body of said tubular unit by engagement with the inner wall thereof, and like flanges at the opposite side of the web for engagement with and positioning of a second tubular body in end to end relation to such first body. Shoulders or the like disposed in suitable relation to said flanges establish a desired end to end spacing between said tubular bodies, whereupon the web structure may be common to a pair of tubular bodies and uniformly positioned with respect thereto.

A feature of my invention, therefore, resides in the combination with a tubular body, of diaphragm means having a web extending transversely of said body and provided with means for positioning a second tubular body in end to end relation to said first body, while disposing such web substantially equidistantly intermediate said positioned tubular bodies.

A feature of my invention is a cellular structure comprising a suitable number of novel tubular structural units, each having similar structural characteristics, and embodying wholly internal stiffening diaphragm means.

A feature of my invention resides in the means for forming a wall structure or the like having spaced parallel walls interconnected by transverse walls integral with said spaced walls and homogeneous therewith, said transverse walls transmitting stresses from one to another of said spaced walls with minimum stress flow concentrations or disturbance.

Other features and advantages will hereinafter appear.

In the accompanying drawings:

Fig. 1 is an elevation, partly in section, of a structural unit embodying the present invention;

Fig. 2 is a bottom view of the unit, taken on lines 2—2 of Fig. 1;

Fig. 3 is a section taken through a pair of tubular units positioned end to end for welding to a common transverse diaphragm structure, but prior to welding;

Fig. 4 is a fragmentary enlarged section, showing portions of the units of Fig. 3 after welding to the transverse diaphragm structure;

Fig. 5 is a perspective of a portion of a floor or deck constructed from structural units pursuant to the present invention;

Fig. 6 is a section taken through a second form of tubular structural unit;

Fig. 7 is a schematic representation of certain stresses imposed upon the wall or bulkhead of a flooded compartment, dam, retaining wall, or the like;

Fig. 8 is a perspective of a portion of a bulkhead constructed according to the present invention;

Fig. 9 is a graphic representation of stress flow within the structural units forming the present invention;

Fig. 10 is an end view of a girder formed according to the present invention;

Fig. 11 is an elevation of a portion of a wall panel embodying a third form of structural unit of the invention; and Fig. 12 is a plan view of the wall of Fig. 11.

Referring to the drawings for a more detailed description of the invention, the improved structural unit 20, Fig. 1, comprises, in preferred form, a hollow rectangular tubular body 21 of suitable and preferably standard length. Most preferably, body 21 is of seamless drawn metal of suitable structural quality, and is formed with plane faces, opposing faces being in parallelism.

The end walls of such bodies may be pierced to provide apertures 22 of suitable dimension. Such apertures may be oval, or elongate with semi-circular ends. It is considered of importance that such apertures be free from abrupt changes in contour, to insure smooth flow of stress from one to another face of the unit. As appears from Figs. 1 and 5, the walls of such apertures 22 may be flanged inwardly, and thus the piercing may be without sacrifice of strength or rigidity.

As is evident from Fig. 2, the units 20, being rectangular in contour and of uniform wall thickness, are structurally symmetrical, in that the neutral and geometric axes must coincide.

The internal and external wall boundaries of the tubular bodies 21 are rounded; such construction, see Fig. 9 in which arrows F, F, represent applications of forces to the faces of associated units, affords free and uniform transmission and distribution of stress from the point of application of the force, through the walls of the units, to the opposite face, as indicated by the broken lines. Because of the homogeneity of the bodies and the absence of internal obstruction, the structural performance of the units approaches the theoretical objective of all engineering structures. In a typical unit nine inches wide and two inches deep, and having a wall thickness of one-sixteenth inch, a satisfactory radius of curvature at inner wall corners is one eighth inch.

Units 20 form, basically, spaced facial walls interconnected by walls which are integral and homogeneous therewith. Distribution of stress within the body of a unit follows a smooth pattern, devoid of concentrations. Except for forces applied at the welded areas 23 between contiguous units, such welded areas are not subjected to stress flow. Forces applied to such welded areas are diffused to the adjacent tubular units, and are distributed substantially uniformly therethrough.

Secured to one end of tubular body 21 as by a jam fit or tack welds (see Fig. 3), is a transverse diaphragm structure 24, comprising a web 25 and flanges 26, 26a. Preferably diaphragm 24 is cast or forged from material the same as the material of bodies 21. As appears in Fig. 4, the relationship of flanges 26, 26a, to web 25 may be such as to present, in section, an I-beam configuration.

As shown, flange 26 serves to position the body 21 of a second tubular unit in end to end relation and axial alignment with the body of the unit of which diaphragm 24 is a part. Shoulders 27 are provided, to suitably space the ends of such tubular bodies 21 with respect to the web 25, and to provide continuous peripheral channels for the reception of weld metal; preferably, web 25 is equidistantly spaced between bodies 21 and is therefore common to both and uniformly positioned with respect thereto. A further feature of diaphragm 24 resides in the peripheral rim 28, which provides weld metal for the securement of the units to each other and to the diaphragm; volume of rim 28 therefore approximates the combined volumes of the stated peripheral channels.

Upon telescoping the open end of a unit over flange 26, see Fig. 3, and applying a welding electrode or arc to rim 28, the respective tubular bodies 21 and stiffener diaphragm common thereto may be fused into a substantially integral mass at the areas of contact. The dotted line indicated in Fig. 4 approximates the area of weld penetration.

For uniformity and substantial homogeneity of the bond between bodies 21 and diaphragm 24, the weld may be ground or machined to remove voids, and then back-welded. Any suitable number of bodies 21 may be arranged in seriatim and in this manner, according to the distance to be spanned if the ultimate structure is to be a floor or deck, or the height of the unit, if a wall or other vertical panel is to be erected. The thus prepared seriatim interconnected units may be positioned in wall to wall relation and interconnected to like units by welding along the areas of mutual engagement, as later described.

The welding of bodies 2 in end to end relation as aforesaid, joins contiguous bodies to each other and to a stiffener structure which is common to a pair of bodies 21 by a continuous peripheral seam of substantially integral metal. Each diaphragm structure provides wholly internal means common to a pair of tubular bodies 21 for stiffening the same against collapse.

The maximum overall length of a unit 20, measured from end to diaphragm, is a function of the wall thickness of the body 21 considered in relation to the depth and breadth of the unit. A unit, whether used vertically as a component of a wall, or horizontally as an element of a floor, is subjected to flexural strains according to known laws of structures. Excessive deflection of a unit will result in a buckling or collapse in a line transversely of the long axis of the unit; the probable point of collapse is calculable. Such calculated point of collapse, with due provision for safety factor, determines the position of a diaphragm 24 for any one unit. Diaphragms 24, in addition to internally strengthening a pair of seriatim interconnected tubular bodies, afford homogeneous structures accommodating flow of stress from one to another of the faces of a unit, and provide for the interconnection of the tubular bodies in end to end relation.

Fig. 5 represents a portion of a floor or deck or like transverse load-carrying panel, constructed pursuant to the present invention.

Units 20a, 20a, are typical of any desired succession of units interconnected in seriatim as by the welding method aforesaid, to provide a beam or stringer. The indicated transverse weld line represents the position of an internal diaphragm 24. Duplicate units 20b, 20b, are interconnected in seriatim according to the requirements of span and are secured, by welding, to the stringer unit 20a. A second run of seriatim-interconnected units, of which unit 20c is one, having previously been prepared, is positioned and secured to stringer unit 20a by welding thereto. Similarly, other runs of units, of which unit 20d represents a portion of one unit, are prepared, positioned in wall to wall abutting relation with the adjacent run of units 20c and welded to stringers 20a. Adjacent runs of units are welded together at the areas of wall to wall contact, to form a continuous welded securement at the top and bottom faces of such units.

The completed deck or panel has smooth wall surfaces in parallelism, and being wholly internally stiffened, is free from external bracing members.

Under conditions where stringer units 20a are to carry the deck load and yet have the same depth as units 20b, 20c, etc., it is obvious that such stringer units must either have a greater wall thickness, where identical materials are used for units 20a and 20b, or be formed from a material having a suitable higher ultimate unit strength. The requisite high ultimate strength may, under certain extreme conditions, approach the yield point of the material, in which circumstance, the structure may be vulnerable to shock loads.

The present invention affords a novel and practicable means in solution of this condition, in permitting the fabrication of a composition section, designated 200, see Fig. 6, in which an outer tubular body 201 of the same dimension and material as the units 20b, 20c, etc., is combined with an inner tubular 201a, of material having the required high ultimate strength. The inner body may be shrunk by cooling and the outer body expanded by heating, both operations being accomplished under temperature control. In such contracted and expanded status, the respective bodies may be telescoped, whereupon on return to normal temperature the composite unit has great strength and resistance to shock loads and identical welding and finishing properties as the transverse units with which used. Also in common with the standard transverse units, composite unit 200 is structurally symmetrical.

It will be understood that a diaphragm structure 24 is employed for internally strengthening the composite units 200. With such unit, the flanges 26 of the diaphragm engage walls of the inner body 201a, and rim 28 may be of sufficient volume to provide weld metal for joining units placed in end to end abutting relation pursuant to the method previously described.

Fig. 7 represents, schematically, a load diagram for a dam, water tight bulkhead, or like panel subjected to water pressure on one face. Such bulkhead ABCD is assumed subjected to water pressure increasing from zero at a point above the bulkhead, pursuant to standard marine practice, to a maximum at the base. Line XY represents such increasing pressure. Additionally, a bulkhead must withstand inwardly directed pressures imposed by the pressure of water against the side plating of the vessel; the bending action of such combined inwardly directed forces and water pressure is indicated by the transverse dotted lines.

Pursuant to conventional marine practice, a watertight panel usually comprises a single panel of riveted or welded plates, externally stiffened by longitudinally arranged angle members welded or riveted to the panel, and one or more vertical stiffeners having a triangular profile corresponding to the XY load line of Fig. 7. In such standard practice, the transverse and vertical stiffeners encroach upon cargo space, form a non-symmetrical structure in that the neutral and geometric axes must necessarily be non-coincident, and engender stress flow disturbances and concentrations because of the irregularity of structure and abrupt angles of interconnection of the respective elements.

A portion of a bulkhead constructed according to the present invention is shown in Fig. 8. In this bulkhead, a suitable plurality of seriatim interconnected bodies are prepared by welding at transverse stiffener diaphragms as aforesaid, and built up in horizontal courses, as shown. The lowermost course, designated 20—1, comprises units of relatively less height and greater wall thickness than units in successive upward courses. As indicated, the unit heights increase, and the unit wall thicknesses decrease in successive upward courses, to a maximum height and minimum wall thickness at the upper course of units 20. In such manner, the bulkhead strength and resistance to imposed pressures increases substantially proportionally to the load imposed upon it. The horizontally arranged units form columns of great compressive strength, in resistance of the inwardly directed pressures imposed by the side plating of the vessel. It will be observed that increase in the strength of the bulkhead is accomplished while maintaining a uniform face to face dimension throughout; the bulkhead is wholly internally stiffened by the diaphragms of the units comprising the respective courses, and the smooth faces of the bulkhead are adaptable to any decorative treatment.

Each unit in a course is welded to its adjacent unit in an upper and lower course, and it will be observed that each diaphragm as indicated by the vertical weld lines, is welded to a diaphragm of an upper and lower course, thus providing continuous vertical stiffening of the bulkhead, and that the weld metal of such diaphragm is bonded to the longitudinal welded joint between courses, thus securing each diaphragm structure to the tubular bodies of adjacent courses. It will be understood that the last unit of each course, designated 20x, may be devoid of diaphragm, being welded directly to the side plating of the vessel.

A bulkhead thus formed is structurally symmetrical, and stresses are transmitted freely and uniformly throughout the structure, and from the structure to the plating of the vessel. To accommodate bilge curvature or the like, any suitable means, such as bilge closure plate 30, may be employed.

Figure 10 is an end view of a girder or like structural member embodying the principles of the present invention. The girder comprises a suitable plurality of courses of seriatim-connected units, all units being of the same face to face dimension. As clearly appears, the units decrease in height and increase in wall thickness, ranging from the center course of units to the upper and lower courses 20—2. End to end abutting bodies of a course are interconnected at their respective stiffener diaphragms (not shown) and each course and the stiffener diaphragms thereof are welded to its adjacent course at the illustrated seam welds 23. As previously, the diaphragms of the respective units afford wholly internal stiffening. Cap and base plates 40, 40, may be welded to upper and lower course units 20—2.

A girder constructed as aforesaid approaches the theoretical "parabolic" girder section more closely than does the conventional built-up girder, because the wall thickness of the section increases proportionally to the distance from the neutral transverse axis. By suitable selection of units 20, any desired parabolic section may be approximated, while maintaining planar outer wall faces, internal stiffening, structural symmetry, and substantial absence of stress concentrations.

Fig. 11 illustrates a portion of a typical vertical wall panel, constructed according to the methods of the present invention. The units 20 may be of trapezoidal form, in which the principal faces, representing the ultimate wall faces, are in parallelism, with the remaining planar walls in suitable uniform angular relation thereto.

The wall panel may be constructed from any required plurality of vertical rows of units 20, each row, if the room height so requires, comprising two or more bodies in end to end relationship interconnected at a transverse diaphragm, the position of which is indicated by the transverse line of welded securement, 23.

As appears from Figs. 11 and 12, the units may be arranged to form a straight wall; it will be apparent, however, that the units may be so placed in wall to wall abutting relation as to form a corner angle or offset wall.

In whatever selected manner of wall to wall positioning, adjacent rows of vertical units are secured by welding at the areas of abutment, as appears from the vertical weld lines 23. If desired, a sill 42, to which the units may be welded, may be employed.

As indicate, the tubular units 20 may accommodate piping 43, electrical conduits or other service elements; to this end, it is preferred to provide the webs 25 of diaphragms 24 with suitable apertures 25a, see Fig. 2. Glass wool or like insulation material 44 may be employed, such insulation being placed within the respective units during the fabrication thereof.

It will be obvious that as the prime functions of the diaphragm structures 24, and particularly the webs 25 thereof, are to internally stiffen and strengthen the tubular bodies and to provide homogeneous structures for the transmission of stresses to the various faces of the bodies, the area of the aperture or apertures 25a, when employed, should be materially less than the total area of the web, as appears in Figs. 2 and 3. Furthermore, to preserve the coincidence of the neutral and geometric axes of the units, such apertures should be centered with respect to the bodies of the units.

A panel or other structure formed of the tubular units and according to the method of the present invention is characterized by a plurality of units placed in wall to wall abutting relation and mutually structurally secured by welding at the areas of abutment, such areas being represented by the space defined by the corner curvature of adjacent units. The structure is also characterized by tubular units of uniform depth but variant wall thickness according to the load to be imposed upon the structure and the distribution of such load. As appears from the structures shown in Figs. 9 and 10, the radius of corner curvature of the units increases with the wall thickness, and accordingly more space is afforded for deposit of weld metal between adjacent heavy-walled units than between adjacent light-walled units, with attendant increased strength of the welded connection of such heavy-walled units.

Additionally, the structures are characterized by wholly internal bracing, in which a transverse web and therewith associated flanges are common to a pair of seriatim-interconnected bodies, whereby the bodies are internally strengthened and compressive or bending loads imposed upon the interconnected bodies are smoothly disseminated through the web to other walls of the units.

While I have shown and described my invention as embodied in certain specified forms, it will be understood that it is capable of modifications as to the units and the method of using the same, and that I am not to be limited in the interpretation of the claims except as may be necessitated by the prior art.

I claim as my invention:

A structural panel having planar wall surfaces, comprising the combination with a plurality of courses of wholly integral tubular bodies having planar walls, said tubular bodies being characterized by uniform depth but having a wall thickness according to the distribution of loading on the panel, said courses of bodies being positioned in wall to wall abutting relation and interconnected at the lines of abutment, of internal diaphragm means having a web disposed transversely of such bodies and flanges in engagement with the inner walls thereof, said diaphragm means being secured to said bodies and to the diaphragm means of adjacent courses of bodies.

SAMUEL WEENING.